July 5, 1932. J. E. BODA 1,865,431
PLOW ELEVATING MECHANISM
Filed May 13, 1931 3 Sheets-Sheet 3
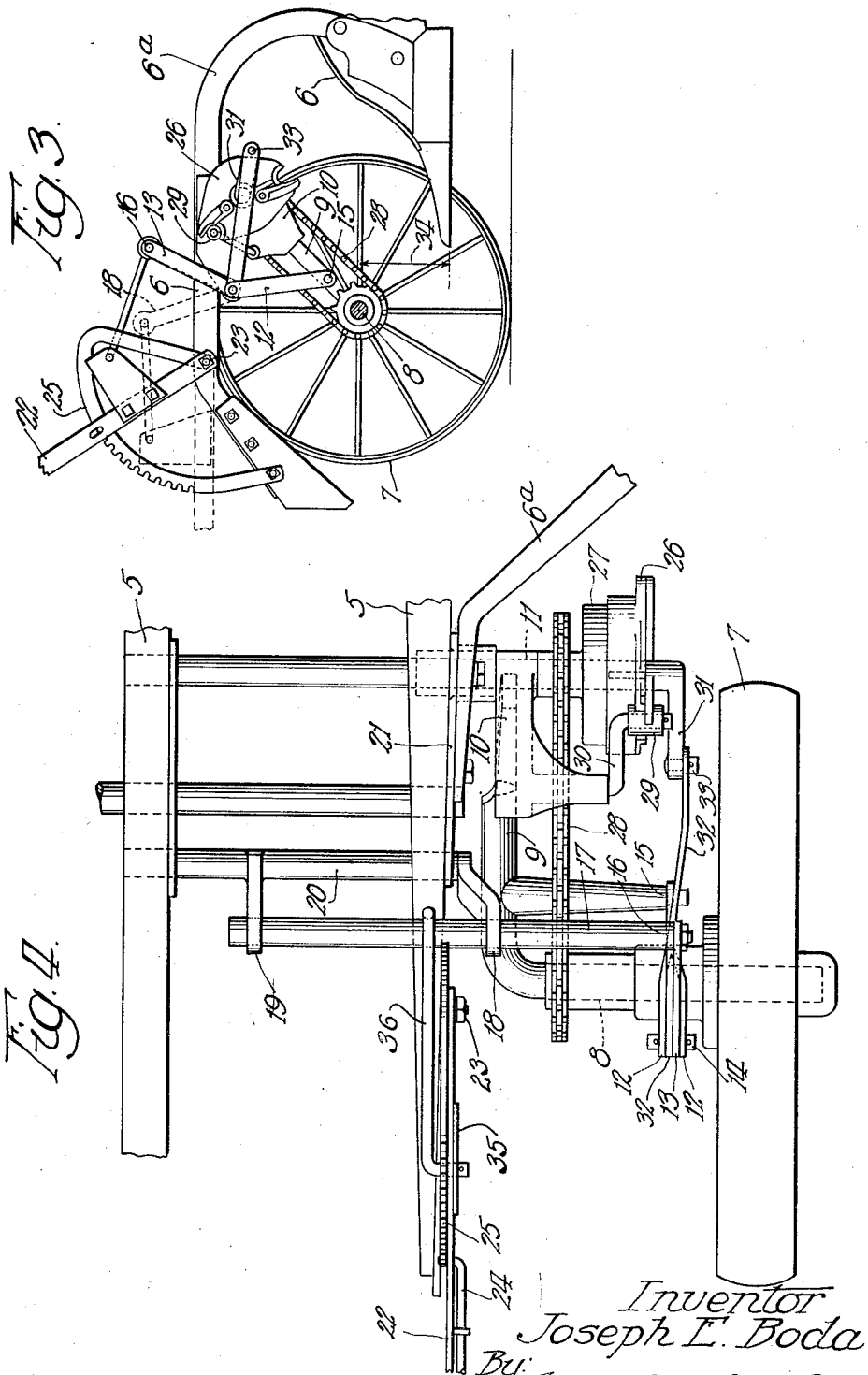
Inventor
Joseph E. Boda Patented July 5, 1932

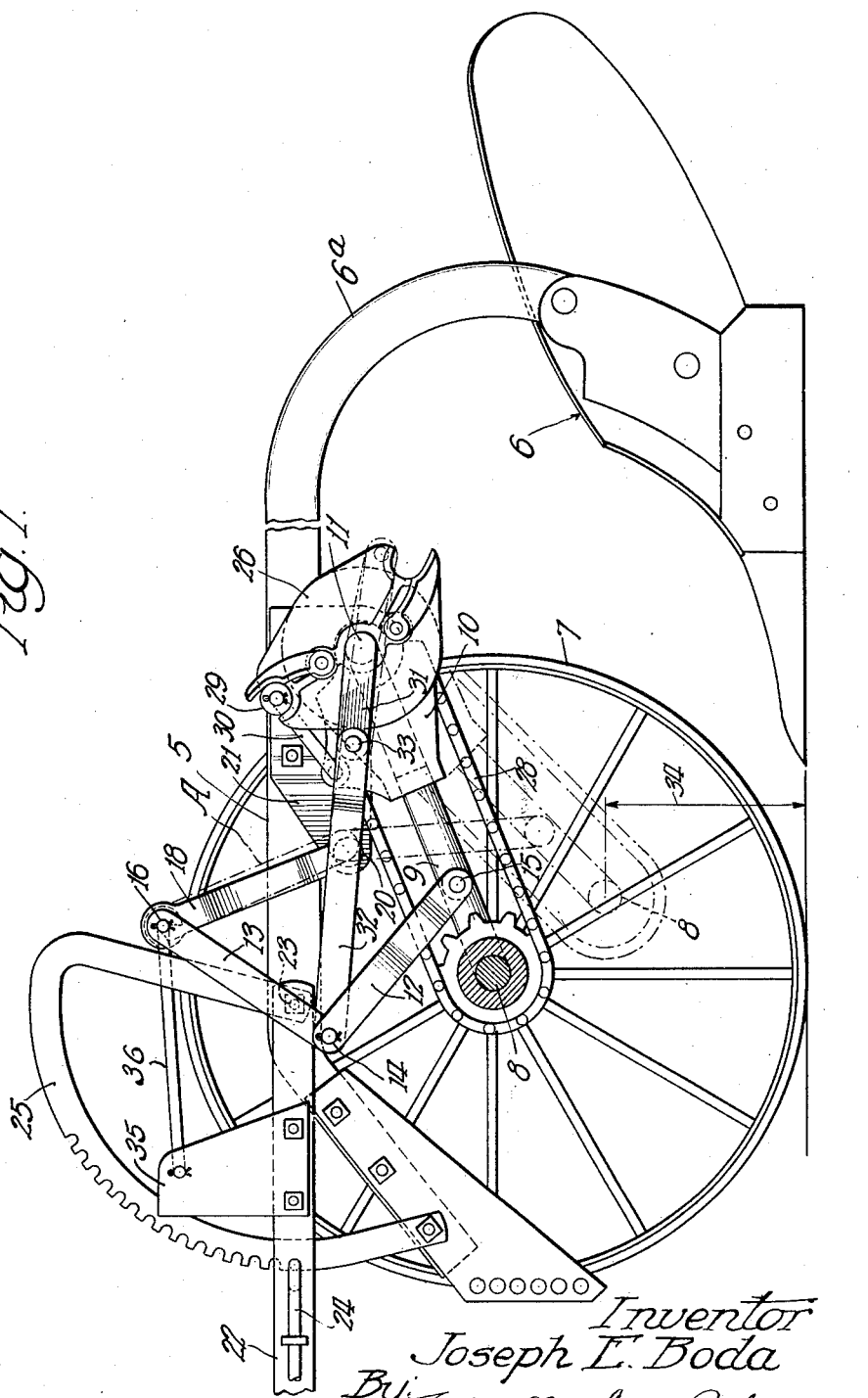

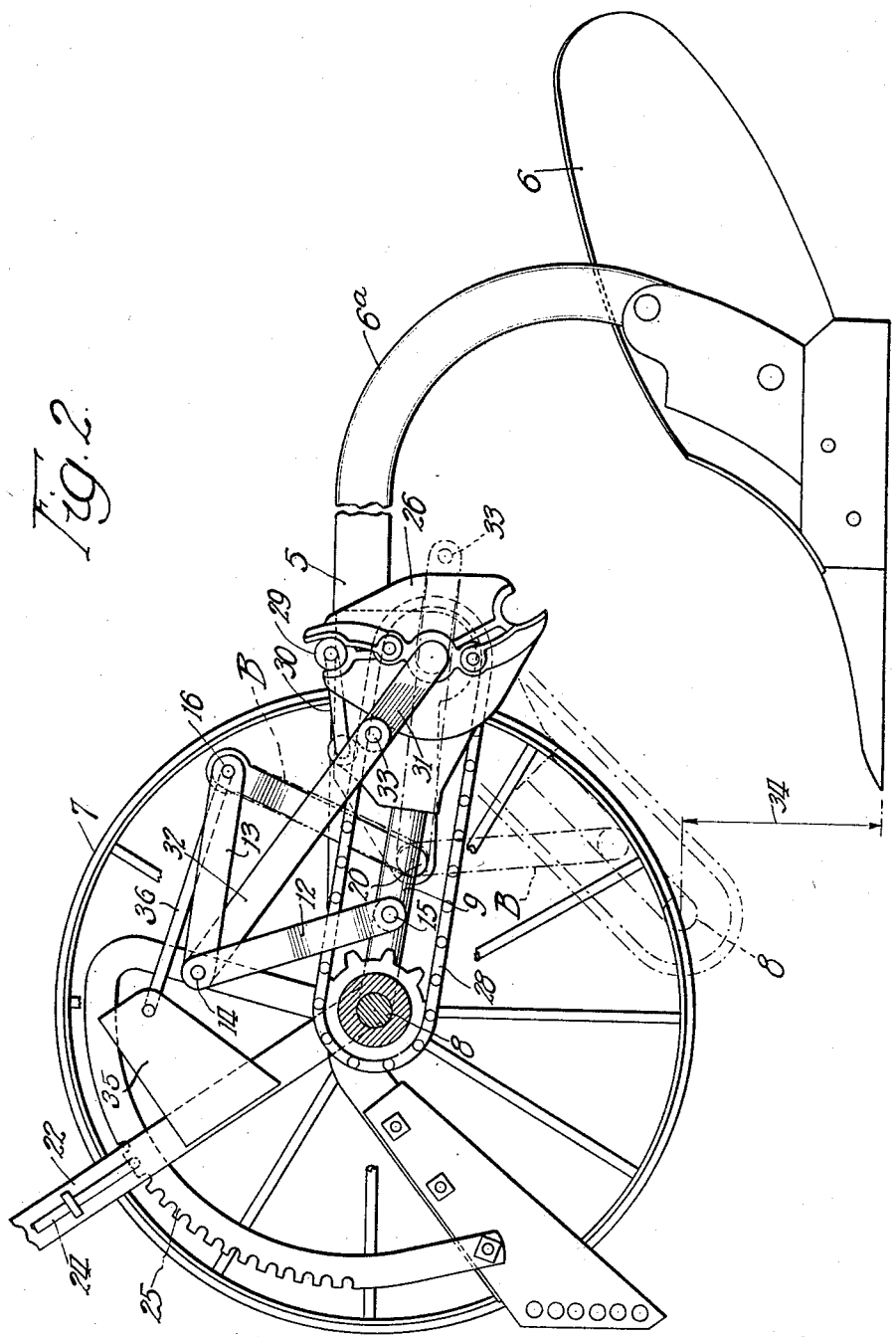

1,865,431

UNITED STATES PATENT OFFICE

JOSEPH E. BODA, OF ROCKFORD, ILLINOIS, ASSIGNOR TO J. I. CASE COMPANY, OF RACINE, WISCONSIN, A CORPORATION OF WISCONSIN

PLOW ELEVATING MECHANISM

Application filed May 13, 1931. Serial No. 537,114.

This invention relates to plow elevating mechanism.

The main object of the invention is to provide a plow elevating mechanism which will raise the plow to a predetermined elevation above the ground level, regardless of the depth at which the implement is set to plow. It is also an object of the invention to provide such elevating mechanism which may be operated either manually or by power means.

Other objects and advantages of the invention will be understood by reference to the following specification and accompanying drawings (three sheets), in which I have illustrated a plow having a power-driven elevating mechanism embodying a selected form of my invention.

In the drawings:

Figures 1 and 2 are side elevations, the ground wheel on the near side of the implement being omitted and the axle shown in section in each figure for purposes of clarity.

Figure 3 is a side elevation corresponding to Figure 2, but showing the parts in a changed position and on a reduced scale.

Figure 4 is a fragmentary plan illustrating the parts involved in my improved elevating mechanism.

The plow structure illustrated in this instance includes a frame structure 5, to which is attached, by means of an arm 6ª, a plow body 6 or other earth-turning body. Obviously, any form of working element may be attached to the frame instead of the plow body illustrated, and, hence, I use the term "plow body" in the following specification and claims merely to describe the present embodiment of the invention and without limiting the scope of the invention to use in connection with a plow or earth-turning body, such as illustrated.

The frame 5, with its attached plow body 6, is supported by means of ground-engaging wheels, one of which is illustrated at 7, the wheel being mounted on an axle 8 in any suitable manner. The axle 8 is carried by one end of an arm 9 which is connected at its other end to a bracket 10, the latter being mounted for pivotal movement on a shaft 11 which is carried by the frame 5. It will thus be apparent that the arm 9 which extends laterally from the axle 8 is, in effect, pivotally mounted in the frame 5 so that the wheel 7 is adjustable relative to the frame so as to raise or lower the frame relative to the ground. Obviously, the plow body 6 which is carried by the frame is thereby adjustable, i. e., capable of being elevated from the ground, as an incident to adjustment of the ground wheel 7 relative to the frame 5.

For controlling the depth of plowing, I provide a toggle link arrangement which includes a pair of links 12 and 13, which are pivotally connected together, as indicated at 14. The outer end of the toggle link 12 is pivotally connected, as shown at 15, to the axle arm 9, and the outer end of the toggle link 13 is pivotally connected, as shown at 16, to the outer end of a transversely extending rod 17. The rod 17, as clearly shown in Fig. 4, is carried by a pair of transversely spaced links 18 and 19 which are secured to a shaft 20 which is pivotally mounted in the frame 5. It will be apparent that the outer end of the toggle link 13 is, in effect, pivotally connected to the upper end of a link represented by the arm 18 which is mounted on a fixed pivot carried by the frame 5. As clearly shown in Figure 1, the shaft 20 is mounted in a bracket 21 which is fixedly secured to and constitutes a part of the frame 5.

In this instance, I have illustrated power mechanism for elevating the plow, this mechanism including a part 26 which is rigidly mounted on an extension of the shaft 11 so as to be movable in unison with the bracket 10 and arm 9 which are pivotally mounted on the said shaft. The member 26 constitutes one part of a clutch, another part of which is designated 27, this part being adapted to be driven in any suitable manner, for instance, by means of a chain-driving connection 28 to the ground wheel 7. By means of a suitable tripping mechanism including a roller 29 carried by an arm 30, the clutch elements 26 and 27 are adapted to be connected for unitary rotation. It will be understood that the clutch member 27 is normally free to rotate relative to the shaft 11 and that when the part 26 is clutched to the part 27, the shaft 11 is caused to rotate until the clutch part 26 is again disengaged from the continuously driven part 27. This clutch mechanism may be of any suitable automatically disengaging type, and inasmuch as many such clutch structures are well known in the art, it is deemed unnecessary to further describe the details of construction thereof.

At its outer end, the shaft 11 is provided with a crank arm 31 which turns with the shaft. A link 32, pivotally connected at one end to the crank arm 31, as indicated at 33, and at its other end to the toggle links 12 and 13 at the pivotal connection 14 therebetween, serves to transmit turning movement of the crank 31 to the toggle links 12 and 13.

A depth-adjusting hand lever 22 is provided, this lever being pivotally attached, as indicated at 23, to the frame 5 and provided with any suitable form of locking dog 24 for engaging a notched quadrant 25 carried by the frame. The hand lever 22 may be adjusted about its pivot 23 and locked in any desired position on the quadrant 25 to accordingly adjust the plowing depth. The hand lever 22 is connected by means of a bracket 35 and a limb 36 to the rod 17. Movement of the hand lever is thus effective to adjust the arrangement of the toggle links and thereby to adjust the position of the ground wheel relative to the frame whereby plowing depth is controlled. Adjustment of the toggle links follows by reason of the fact that the pivotal connection 14 between the toggle links must travel in an arc about the normally stationary pivot 33 of the link 32.

The operation of the mechanism thus described is as follows: In Figure 1, the plow is indicated in a lowered, plowing position, the position illustrated being, however, the minimum plowing depth, which is substantially the ground level. The depth-controlling hand lever 22 is shown in extreme lowered position with a corresponding position of the toggle links 12 and 13. When it is desired to raise the plow from the ground for transportation or other purposes, the clutch parts 26 and 27 are interlocked so as to impart rotation to the crank arm 31. Through the agency of the link 32, the toggle links 12 and 13 are caused to straighten out and move to the position indicated in broken lines and designated A in Figure 1. In moving from the buckled position shown in full lines in Figure 1 to the position shown in broken lines in said figure, it is obvious that the distance from center to center between the pivots 15 and 16 is materially increased. Since the pivot 16 is, in effect, fixed relative to the frame, the pivot 15 will necessarily move relative to the frame and the arm 9 and ground wheel 7 moved downwardly relative to the frame. Of course, it will be understood that inasmuch as the ground arm is supported, the frame and plow body will be raised relative to the ground.

In Figure 2, the depth-controlling hand lever 22 is shown in an adjusted position which closely approaches the maximum plowing depth position, and the frame 5 and plow 6 are shown in the maximum plowing depth position. By comparison of Figures 1 and 2, it will be seen that as an incident to adjustment of the lever 22 from the minimum plowing depth position of Figure 1 to the approximate maximum plowing depth position shown in Figure 2, the toggle links 12 and 13 have been increasingly buckled while the height of the pivot 16 relative to the frame 5 has not been materially changed. It will be observed that the pivot 16 travels in a slightly arcuate path about the axis of the pivot shaft 20, the arrangement being such that the arc of movement of the pivot 16 would be substantially bisected by a perpendicular rising from the axis of the said shaft 20. The links 18 and 19 constitute guides for controlling the path of travel of the pivot 16, and it will be noted that the path of travel is substantially horizontally disposed, the slight arc thereof being negligible in implements of the type herein concerned.

When the crank arm 31 is caused to rotate through an arc of approximately 180 degrees or slightly less, as provided for by the type of clutch mechanism illustrated, the toggle links 12 and 13 will assume the straightened position shown in broken lines and designated B in Figure 2. It will be seen that when the parts are in the position shown in Figure 2, the toggle links 12 and 13 will not be adjusted through a straight line position, but that their final adjusted position closely approximates that shown in broken lines in the arrangement illustrated in Figure 1. Hence, it appears that each movement of the crank 31 is effective to impart substantially the same amount of elevating movement to the ground wheel relative to the frame 5, rewardless of the depth to which the plow is set for operation. The arrow 34 in Figures 1 and 2 indicates the normal distance between the bottom of the plow and the ground wheel axis when the plow is raised out of the ground. It will be observed that the distance 34 is substantially the same in both figures, although the plowing depth for which the hand lever is set is decidedly different in the respective figures.

The increased movement imparted to the ground wheel relative to the frame when the parts are in the position shown in Figure 2, as compared with the movement imparted to the ground wheel relative to the frame when the parts are in the position shown in Figure 1, is accounted for by the fact that when the parts are in the position shown in Figure 2, the entire movement of the crank 31 imparts elevating movement to the ground wheel, whereas, when the parts are in the position shown in Figure 1, the portion of the movement resulting from the throw of the crank 31 results in a reverse buckling of the toggle links 12 and 13, which has a slight lowering effect on the plow instead of an elevating effect. Also, in Figure 2, the links 12 and 13 are in such position that the pivot 14 is further from an imaginary straight line connecting the pivots 15 and 16 than it is in the arrangement shown in Figure 1, so that the path of travel of the pivot 14 in Figure 2 more closely approximates parallelism with the imaginary line referred to, than it does in the Figure 1 arrangement.

I am aware that the above described construction may be modified without departing from the spirit of my invention, the scope of which should be determined by reference to the following claims, the same being construed as broadly as possible consistent with the state of the art.

I claim as my invention:

1. In an agricultural implement, the combination of a frame, a plow body carried by the frame, a ground wheel, means for vertically, adjustably mounting said ground wheel on the frame, the frame and plow body being vertically adjustable relative to the ground as an incident to adjustment of said wheel relative to the frame, a toggle link mechanism having one end of the toggle connected to the ground wheel mounting means and its other end connected to said frame, and means connected with said toggle for adjusting the same from buckled position to relatively straightened position for elevating said plow body to inoperative position above the ground.

2. In an agricultural implement, the combination of a frame, a plow body carried by the frame, a ground wheel, means for vertically, adjustably mounting said ground wheel on the frame, the frame and plow body being vertically adjustable relative to the ground as an incident to adjustment of said wheel relative to the frame, a toggle link mechanism having one end of the toggle connected to the ground wheel mounting means and its other end connected to said frame, means connected with said toggle for adjusting the same from buckled position to relatively straightened position for elevating said plow body to inoperative position above the ground, and means for adjusting the position of the links of said toggle mechanism relative to each other for adjusting the plowing depth of the implement.

3. In an agricultural implement, the combination of a frame, a plow body carried by the frame, a ground wheel and an axle therefor, an arm connected at one end to said axle, extending laterally therefrom and pivotally mounted at its other end on said frame, a toggle including a pair of links pivoted together, the outer end of one of said links being pivoted to said arm, a guide member connected with said frame and having the outer end of the other of said toggle links connected thereto for movement in a predetermined path of travel, means connected to said toggle for effecting adjustment of the relative angular relation of the toggle links, thereby to elevate the plow to an inoperative position above the ground, and means for adjusting said guided link end to adjust the normal angular relation of said toggle links to each other, and thereby to adjust the normal plowing depth of the implement.

4. In an agricultural implement, the combination of a frame, a plow body carried by the frame, a ground wheel and an axle therefor, an arm connected at one end to said axle, extending laterally therefrom and pivotally mounted at its other end on said frame whereby the ground wheel is adjustable vertically relative to the frame about the pivotal connection between said arm and frame, power means including a crank arm for effecting such adjustment of said wheel, a toggle including a pair of links pivoted together, the outer end of one of said links being pivoted to said arm, a guide member having the outer end of the other of said links connected thereto for movement in a predetermined path of travel, a link connecting said crank arm and said toggle whereby movement of said crank arm is effective to adjust said toggle, and means for adjusting said guided link end to adjust the normal angular relation of said toggle links to each other, and thereby to adjust the normal plowing depth of the implement.

JOSEPH E. BODA.